Feb. 23, 1926. 1,574,149
H. HOMPES ET AL
CREAM DIVIDER
Filed Jan. 24, 1924
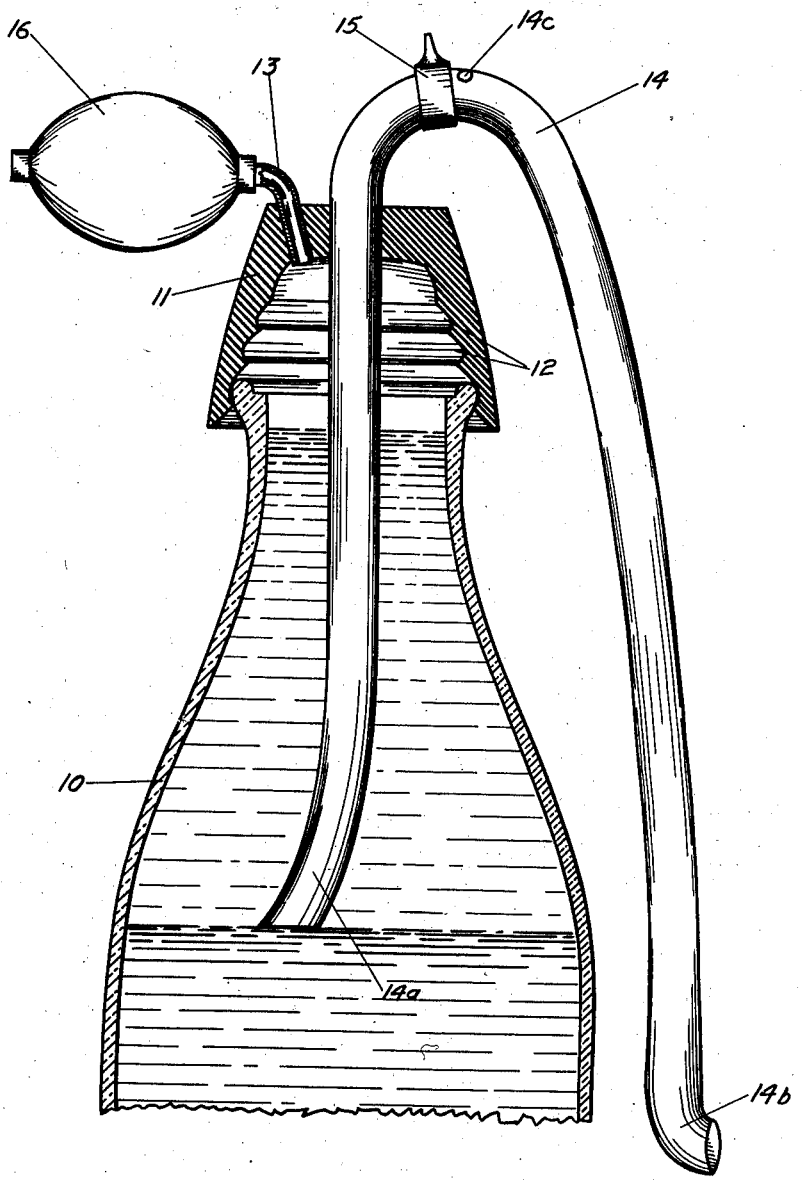
H. HOMPES
G. L. DELONG   INVENTORS
BY
ATTORNEY Patented Feb. 23, 1926.

1,574,149

UNITED STATES PATENT OFFICE.

HENRY HOMPES, OF LINCOLN, AND GEORGE L. DE LONG, OF HAVELOCK, NEBRASKA.

CREAM DIVIDER.

Application filed January 24, 1924. Serial No. 688,189.

*To all whom it may concern:*

Be it known that we, HENRY HOMPES and GEORGE L. DE LONG, citizens of the United States, residing at Lincoln and Havelock, respectively, in the county of Lancaster and State of Nebraska, have invented certain new and useful Improvements in Cream Dividers, of which the following is a specification.

Our invention relates to milk and cream dividers of the siphon type, it being our object to provide a divider which can be manufactured and sold at a low price and which will be convenient in use.

Milk is being now delivered to the homes in bottles of standardized form and size, this practice being virtually universal. The cream and milk in the bottle separate into distinct layers under the influence of gravity, the cream constituting the top layer. It often becomes desirable to draw off either the cream or the milk but the spoons and other kitchen utensils which are usually employed for this purpose give unsatisfactory results with the expenditure of considerable time and trouble. With our cream divider the operation can be performed in the minimum of time and without any of the annoying results connected with the use of unsuitable utensils.

Having in view the objects above referred to and others will appear in the following description, we will now refer to the drawing, in which the figure is a view of a milk bottle with our divider attached thereto, parts being shown in section.

The milk bottle is designated by the numeral 10. Fitting tightly over the mouth of the milk bottle is a cap 11. The cap 11 is preferably constructed out of soft or semi-soft rubber or other similar material having the necessary resiliency and the binding action required for the cap. The under side of the cap is concave and the inner lateral walls are provided with circular grooves 12. In our preferred construction, we provide three of these grooves to accommodate all sizes of milk bottles but it is obvious that the number of circular grooves may be varied so that there may be either more or less than three. These circular grooves are arranged in a descending series, the groove of the largest diameter being the lowermost one.

The shape of the circular grooves is important. As inspection of the figure will show, the lower wall of each groove 12 is so formed that it hugs tightly the lower edge of the outer flange of the neck of the milk bottle. The upper wall of the groove has a more gradual slope toward the groove immediately above. The cap 11 is designed for the purpose of fitting milk bottles of various sizes, and because of the resiliency of the material of which it is constructed it may be pushed down on the neck of the bottle until the neck of the bottle is seated in the proper groove. Because of the shape of the grooves as above described, downward pressure on the cap will cause the larger grooves to pass readily over the bottle neck without being obstructed in its passage. For a similar reason the cap is bevelled on its inner surface below the lowermost groove so that the necks of the largest milk bottles will readily be seated in the lowermost groove.

The cap 11 is provided with an aperture for the insertion of the siphon 14. The siphon has a sliding relation with respect to the cap but the connection at all times is air tight. The inner or shorter leg of the siphon is bent as shown at 14ª in the figure and is provided with a horizontal mouth. The outer or longer leg is sharply outturned at 14ᵇ and is provided with a more or less vertical mouth. The siphon is also provided with an air vent 14ᶜ which may be readily closed or opened by means of the rubber band 15 surrounding the siphon tube. The band 15 has a handle portion as shown whereby it may be easily shifted from either position to the other.

The cap 11 also has an air vent which may be made to function either with or without an air bulb. In the drawing we show our invention with an ordinary atomizer bulb attached thereto, the bulb being provided with a valve in its rear portion through which the outer air can pass into but not out of the bulb. The bulb may have attached thereto a nozzle 13 which is adapted to fit snugly into the air vent of the cap, or a metallic or other suitable tube may be permanently fitted in the air vent of the cap. In the latter case the nozzle of the bulb could whenever desired be fitted over the protruding outer end of the tube in the air vent.

Our invention is extremely simple in use. The paper cap of the milk bottle is first removed and the cap 11 is then secured to the mouth of the milk bottle in the manner already described. The siphon is then adjusted vertically until its inlet end is at the cream level and the band 15 is moved to close the air vent 14ᶜ. A slight pressure on the bulb 16 temporarily increases the air pressure within the milk bottle and starts the flow of the siphon. The valve of the bulb permits the continous inward flow of air to force out all of the cream from the bottle. If it is desired to use the device without the bulb, the bottle is simply given a slight tilt in the direction of the outer leg of the siphon to start the flow of cream through the siphon. If it is desired to remove the milk but to leave the cream in the bottle, the connections are made in the usual way and the siphon is then pushed down until its inlet end is at or near the bottom of the bottle. The bottle is then elevated and the siphon is started. The milk flows out quietly and gradually, but when the cream level is reached the band 15 must be shifted to open the air vent 14ᶜ to stop the flow through the siphon.

Our primary purpose is to provide a siphon device as above described for use with bottles of milk for dividing the milk and the cream. It is obvious however that the methods and structures which we employ would function equally well in other places where it is desired to divide stratified liquids. For example, crank case oils are frequently allowed to stand and settle in garages, the lighter oil rising to the top and the water and particles of solid matter settling to the bottom. Our device will function perfectly in bringing about a separation and division in such a mixture. For this reason we reserve to ourselves the right to modify the form and dimensions of the various parts so that the device may be used in connection with any suitable container of stratified liquids.

Having thus described our invention in terms which will be readily understood by others skilled in the art to which it pertains, what we believe to be new and desire to secure by Letters Patent of the United States is:—

A cream divider including a flexible and resilient inverted cup shaped closure for the mouth of a milk bottle, said closure being provided with a plurality of concentric and superposed grooves on its inner surface, each of the grooves having an abrupt slope in its lower portion and a gradual slope in its upper portion, and a siphon passing through said closure, said siphon having a horizontal inlet and a vertical outlet.

In testimony whereof we affix our signatures.

HENRY HOMPES.
GEORGE L. De LONG.